(12) United States Patent
Zhang

(10) Patent No.: US 10,163,375 B2
(45) Date of Patent: Dec. 25, 2018

(54) FOLDABLE DISPLAY APPARATUS

(71) Applicant: WUHAN CHINA STAR OPTOELECTRONICS TECHNOLOGY CO., LTD., Wuhan, Hubei (CN)

(72) Inventor: Di Zhang, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 106 days.

(21) Appl. No.: 15/303,626

(22) PCT Filed: May 23, 2016

(86) PCT No.: PCT/CN2016/082950
§ 371 (c)(1),
(2) Date: Oct. 12, 2016

(87) PCT Pub. No.: WO2017/166403
PCT Pub. Date: Oct. 5, 2017

(65) Prior Publication Data
US 2018/0144667 A1 May 24, 2018

(30) Foreign Application Priority Data
Mar. 30, 2016 (CN) .......................... 2016 1 0191157

(51) Int. Cl.
*G09F 9/30* (2006.01)
*G09F 9/00* (2006.01)
*G06F 3/041* (2006.01)

(52) U.S. Cl.
CPC ............ *G09F 9/301* (2013.01); *G06F 3/0412* (2013.01); *G06F 3/0416* (2013.01); *G09F 9/00* (2013.01);
(Continued)

(58) Field of Classification Search
CPC ...... G09F 9/301; G06F 3/0412; G06F 3/0416; G06F 2203/04102; G06F 2203/04103; G06F 1/1641; G06F 1/1652
See application file for complete search history.

(56) References Cited

U.S. PATENT DOCUMENTS 9,348,450 B1 *  5/2016  Kim ...................... G06F 1/1681
9,829,923 B2 * 11/2017  Lee ....................... G06F 1/1679
(Continued)

FOREIGN PATENT DOCUMENTS

CN    103576973 A    2/2014
CN    103738231 A    4/2014
(Continued)

*Primary Examiner* — Tom V Sheng
(74) *Attorney, Agent, or Firm* — Ladas & Parry LLP

(57) ABSTRACT

A foldable display apparatus is provided. The foldable display apparatus includes a first substrate, a second substrate, a flexible display panel having a first display area, a pliable display area and a second display area, which are sequentially connected, a first hinge base, a second hinge base, and a rotary connecting rod. An end of the rotary connecting rod is connected to the first hinge base, and the other end is connected to the second hinge base. When the rotary connecting rod rotates to the folded state, the first substrate and the second substrate are paralleled to and opposite each other.

10 Claims, 1 Drawing Sheet

(52) U.S. Cl.
CPC .............. *G06F 2203/04102* (2013.01); *G06F 2203/04103* (2013.01)

(56) References Cited

U.S. PATENT DOCUMENTS

| | | | | |
|---|---|---|---|---|
| 2006/0077118 | A1* | 4/2006 | Huang | G06F 1/1616 345/1.3 |
| 2006/0146488 | A1 | 7/2006 | Kimmel | |
| 2011/0241998 | A1 | 10/2011 | Mckinney | |
| 2014/0029171 | A1 | 1/2014 | Lee | |
| 2014/0043226 | A1 | 2/2014 | Lee et al. | |
| 2014/0213324 | A1* | 7/2014 | Tan | H04M 1/0268 455/566 |
| 2014/0355195 | A1* | 12/2014 | Kee | G06F 1/1616 361/679.27 |
| 2015/0023030 | A1 | 1/2015 | Tsukamoto | |
| 2105/0230349 | * | 8/2015 | Lee | H05K 5/00 361/749 |
| 2105/0241925 | * | 8/2015 | Seo | G06F 1/16 361/679.27 |
| 2015/0257289 | A1* | 9/2015 | Lee | H05K 5/0017 361/749 |
| 2015/0257290 | A1* | 9/2015 | Lee | H04M 1/0216 361/749 |
| 2016/0295709 | A1* | 10/2016 | Ahn | H05K 5/0017 |
| 2016/0302314 | A1* | 10/2016 | Bae | G06F 1/16 |
| 2017/0360170 | A1 | 12/2017 | Lin et al. | |

FOREIGN PATENT DOCUMENTS

| | | |
|---|---|---|
| CN | 104200753 A | 12/2014 |
| CN | 104461127 A | 3/2015 |
| EP | 2690521 A1 | 1/2014 |
| KR | 20080035709 A | 4/2008 |
| KR | 101458642 B1 | 11/2014 |

* cited by examiner

FOLDABLE DISPLAY APPARATUS

FIELD OF THE INVENTION

The present invention relates to a field of displays, and in particular to a foldable display apparatus.

BACKGROUND OF THE INVENTION

With the development of large screens, people request larger screens, higher resolution, and more exciting visual effects. The development of large screens has become a trend in the industry. However, as the screen size increases, the overall dimension continues to become larger, and the portability reduces gradually, undoubtedly affecting the consumers' enthusiasm to use the screens. In particular, the constraints of the portable size of mobile terminals and consumers' demand for large screens have become a contradiction.

Thus, the prior art is flawed, and needs to be improved.

SUMMARY OF THE INVENTION

A primary object of the present invention is to provide a foldable display apparatus to resolve the problem of in the prior art that increasing the screen size of a display apparatus causes the overall size to be too large.

To solve the above problems, the present invention provides a technical solution as follows:

An embodiment of the present invention provides a foldable display apparatus, comprising:
 a first substrate;
 a second substrate;
 a flexible display panel having a first display area, a pliable display area and a second display area, which are sequentially connected, the first display area covering a front of the first substrate, the second display area covering a front of the second substrate;
  a first hinge base disposed on a back of the first substrate;
  a second hinge base disposed on a front of the second substrate; and
  a rotary connecting rod, one end of the rotary connecting rod rotatably connected to the first hinge base along a first rotation plane, and the other end of the rotary connecting rod rotatably connected to the second hinge base along the first rotation plane;
 wherein when the rotary connecting rod rotates to a folded state, the first substrate and the second substrate are parallel to and opposite each other; and when the rotary connecting rod rotates to a expanded state, the first substrate and the second substrate are coplanar, and the first display area, the pliable display area and the second display area are coplanar.

The foldable display apparatus of the present invention further comprises a touch module disposed on the second substrate, and in the folded state, wherein the touch module contacts the pliable display area of the flexible display panel, thereby controlling a display image on the first display area, and turning off the second display area and the pliable display area; in the expanded state, the touch module separates from the pliable display area, thereby controlling the images of the first display area, the pliable display area and the second display area.

In the foldable display apparatus of the present invention, the touch module includes a vertical plate disposed on the second substrate, a touch sensing unit and a display controlling unit disposed on a vertical plate, wherein the display controlling unit is electrically connected with the touch sensing unit, the first display area, the pliable display area, and the second display.

The foldable display apparatus of the present invention further comprises a stopping mechanism disposed on the first substrate and the second substrate, the stopping mechanism limiting the first substrate and the second substrate to the expanded state or the folded state.

In the foldable display apparatus of the present invention, in the expanded state, a first end of the first substrate is close to and opposite a second end of the second substrate; the first hinge base is disposed near the first end, and the second hinge is disposed near the second end.

In the foldable display apparatus of the present invention, the stopping mechanism includes a first stopper disposed on the back of the first substrate and a second stopper disposed on the front of the second substrate, the first stopper is positioned on a side of the first hinge base away from the first end, the second stopper is positioned on a side of the second hinge base away from the second end, and in the folded state, the first stopper and the second stopper respectively abut the rotary connecting rod.

In the foldable display apparatus of the present invention, the first stopper and the second stopper each has a bevel cut, and bevels of the first stopper and the second stopper are used to abut the rotary connecting rod in the folded state.

In the foldable display apparatus of the present invention, the bevels of the first stopper and the second stopper each has an elastic layer.

In the foldable display apparatus of the present invention, the stopping mechanism further includes a first stopping slot disposed on the back of the first substrate and a second stopping slot disposed on the front of the second substrate, the first stopping slot is positioned on a side of the first hinge base near and through the first end, the second stopping slot is positioned on a side of the second hinge base near and through the second end, in the expanded state, parts of the rotary connecting rod near the two ends respectively are received in the first stopping slot and the second stopping slot.

In the foldable display apparatus of the present invention, the first substrate and the second substrate are rectangular shaped plates.

The present invention further provides a foldable display apparatus, comprising:
 a first substrate;
 a second substrate;
 a flexible display panel having a first display area, a pliable display area and a second display area, which are sequentially connected, the first display area covering a front of the first substrate, the second display area covering a front of the second substrate;
 a first hinge base disposed on a back of the first substrate;
 a second hinge base disposed on a front of the second substrate;
 a rotary connecting rod, one end of the rotary connecting rod rotatably connected to the first hinge base along a first rotation plane, and the other end of the rotary connecting rod rotatably connected to the second hinge base along the first rotation plane;
 wherein when the rotary connecting rod rotates to a folded state, the first substrate and the second substrate are parallel to and opposite each other, and when the rotary connecting rod rotates to a expanded state, the first substrate and the second substrate and are coplanar, and the first display area, the pliable display area and the second display area are coplanar, a touch module disposed on the second substrate, and in the folded state, wherein the touch module contacts the pliable display area of the flexible display panel, thereby controlling a display image on the first display area, and turning off the second display area and the pliable display area; in the expanded state, the touch module separates from the pliable display area, thereby controlling the images of the first display area, the pliable display area and the second display area; and a stopping mechanism disposed on the first substrate and the second substrate, the stopping mechanism limiting the first substrate and the second substrate to the expanded state or the folded state.

With respect to the prior art, the foldable display apparatus provided by the present invention achieves folding the flexible display panel when a small screen is needed, and expanding the flexible display panel when a large screen is needed via the rotary connecting rod, the first hinge base and the second hinge base, which not only meets the diverse demands of users for a large screen and a small screen, but also reduces the overall size of the product for ease of carrying without reducing the size of the flexible display panel.

DETAILED DESCRIPTION OF THE PREFERRED EMBODIMENTS

Figure 1:
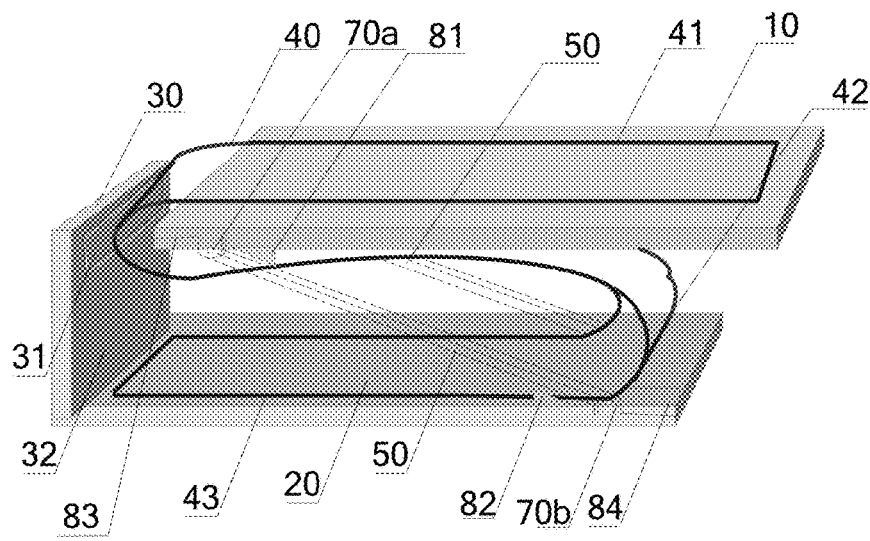
FIG. 1 is a structural schematic diagram of a foldable display apparatus in a folded state in accordance with a preferred embodiment of the present invention.

The following description of the embodiments with reference to the accompanying drawings is used to illustrate particular embodiments of the present invention. The directional terms referred in the present invention, such as "upper", "lower", "front", "back", "left", "right", "inner", "outer", "side surface", etc. are only directions with regard to the accompanying drawings. Therefore, the directional terms used for describing and illustrating the present invention are not intended to limit the present invention.

In the drawings, units with similar structures are indicated by the same reference number.

Figure 2:
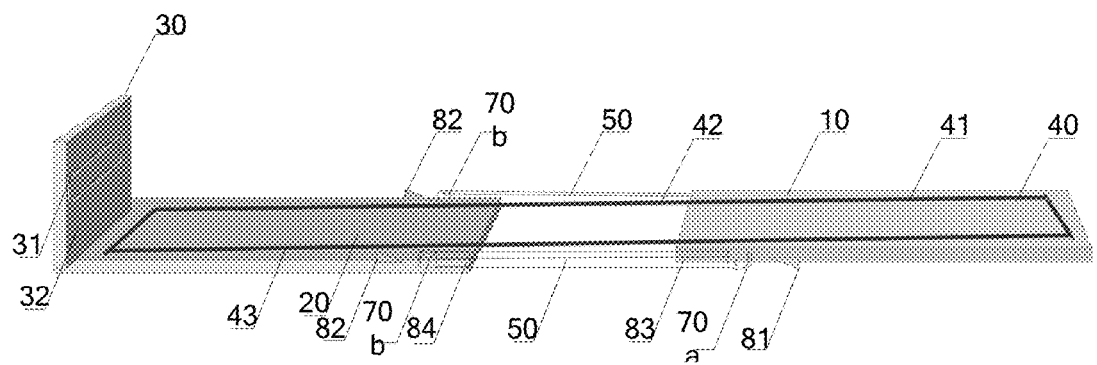
FIG. 2 is a structural schematic diagram of the foldable display apparatus in an expanded state in accordance with the preferred embodiment of the present invention.

Please refer to FIG. 1, which is a structural schematic diagram of a foldable display apparatus in a folded state in accordance with a preferred embodiment of the present invention. Please refer to FIG. 2, too. The foldable display apparatus of the present preferred embodiment includes a first substrate 10, a second substrate 20, a touch module 30, a flexible display panel 40, a rotary connecting rod 50, a first hinge base 70a, and a second hinge base 70b.

The flexible display panel 40 has a first display area 41, a pliable display area 42 and a second display area 43, which are sequentially connected. The first display area 41 covers a front of the first substrate 10, and the second display area 43 covers a front of the second substrate 20. The first hinge base 70a is disposed on a back of the first substrate 10. The second hinge base 70b is disposed on the front of the second substrate 20.

One end of the rotary connecting rod 50 is rotatably connected to the first hinge base 70a along a first rotation plane, and the other end is rotatably connected to the second hinge base 70b along the first rotation plane. The touch module 30 is disposed on the second substrate 20.

When a small screen is needed to use, the foldable display apparatus is folded; the rotary connecting rod 50 rotates to a folded state; the first substrate 10 and the second substrate 20 are parallel to and opposite each other; and the touch module 30 contacts the pliable display area 42, whereby the touch module 30 controls a display image on the first display area 41 and turns off the second display area 43 and the pliable display area 42. When a large screen is needed to use, the rotary connecting rod 50 rotates to an expanded state; the first substrate 10 and the second substrate 20 are coplanar; the first display area 41, the pliable display area 42 and the second display area 43 are coplanar; and the touch module 30 separates from and does not contact the pliable display area 42, whereby the touch module 30 controls the images of the first display area 41, the pliable display area 42 and the second display area 43.

The present invention achieves folding the flexible display panel 40 when a small screen is needed, and expanding the flexible display panel 40 when a large screen is needed via the rotary connecting rod 50, the first hinge base 70a and the second hinge base 70b, which not only meets the diverse demands of users for a large screen and a small screen, but also reduces the overall size of the product for ease of carrying without reducing the size of the flexible display panel 40.

Specifically, the first substrate 10 and the second substrate 20 are rectangular shaped plate. In the expanded state, a first end of the first substrate 10 is close to and opposite a second end of the second substrate 20; that is, the end of the first substrate 10 most close to the second substrate 20 is the first end, and the end of the second substrate 20 most close to the first substrate 10 is the second end. The first hinge base 70a is disposed near the first end, and the second hinge 70b is disposed near the second end.

The touch module 30 includes a vertical plate 32 disposed on the second substrate 30, a touch sensing unit 31 and a display controlling unit (not shown) disposed on the vertical plate 32, wherein the display controlling unit is electrically connected with the touch sensing unit 31, the first display area 41, the pliable display area 42, and the second display 43. The touch sensing unit 31 may employ a capacitive sensor, and, of course, may also employ a resistance sensor. When the pliable display area 42 contacts the touch sensing unit 31, the touch sensing unit 31 generates a first signal and transmits the first signal to the display controlling unit. The display controlling unit controls the display image of the first display area 41 according to the first signal and turns off the second display area 43 and the pliable display area 42. When the touch sensing unit 31 does not contact the pliable display area 42, a second signal is generated and transmitted to the display controlling unit. The display controlling unit controls the display images of the first display area 41, the pliable display area 42 and the second display area 43 according to the second signal.

Preferably, in some embodiments, the foldable display apparatus further includes a stopping mechanism (no reference number) disposed on the first substrate 10 and the second substrate 20; the stopping mechanism limits the first substrate 10 and the second substrate 20 to the expanded state or the folded state.

Specifically, the stopping mechanism includes a first stopper 81 disposed on the back of the first substrate 10 and a second stopper 82 disposed on the front of the second substrate 20. The first stopper 81 is positioned on a side of the first hinge base 70a away from the first end, the second stopper 82 is positioned on a side of the second hinge base 70*b* away from the second end. In the folded state, the first stopper 81 and the second stopper 82 respectively abut the rotary connecting rod 50, thereby keeping the rotary connecting rod 50 in a slanted state and making the foldable display apparatus in the folded state. Furthermore, the first stopper 81 and the second stopper 82 each has a bevel cut, and bevels of the first stopper and the second stopper are used to abut the rotary connecting rod in the folded state. Understandably, the bevels of the first stopper and the second stopper each is provided with an elastic layer, so as to increase the stability of the first substrate 10 in the folded state and have a beneficial effect of shockproof.

The stopping mechanism further includes a first stopping slot 83 disposed on the back of the first substrate 10 and a second stopping slot 84 disposed on the front of the second substrate 20. The first stopping slot 83 is positioned on a side of the first hinge base 70*a* near and through the first end, and the second stopping slot 84 is positioned on a side of the second hinge base 70*b* near and through the second end 70*b*. In the expanded state, parts of the rotary connecting rod 50 near the two ends respectively are received in the first stopping slot 83 and the second stopping slot 84.

Preferably, in the present embodiment, the number of each of the first hinge base 70*a*, the second hinge base 70*b*, the rotary connecting rod 50 is two, and both of them correspond to each other. Therefore, the numbers of the first stopping slots 83, the second stopping slots 84, the first stoppers 81 and the second stoppers 83 are also two, and both of them correspond to each other. Moreover, both the first hinge bases 70*a* are disposed on the both edges of the first substrate 10 close to the first end, and both the second hinge bases 70*b* are disposed on the both edges of the second substrate 10 close to the second end. Both the rotary connecting rods are paralleled to each other and respectively positioned on the outer sides of the pliable display area 42, which have the beneficial effect for increasing the stability of the display apparatus.

In summary, although the preferable embodiments of the present invention have been disclosed above, the embodiments are not intended to limit the present invention. A person of ordinary skill in the art, without departing from the spirit and scope of the present invention, can make various modifications and variations. Therefore, the scope of the invention is defined in the claims.

What is claimed is:

1. A foldable display apparatus, comprising:
   a first substrate;
   a second substrate;
   a flexible display panel having a first display area, a pliable display area and a second display area, which are sequentially connected, the first display area covering a front of the first substrate, the second display area covering a front of the second substrate;
   a first hinge base disposed on a back of the first substrate;
   a second hinge base disposed on the front of the second substrate;
   a rotary connecting rod, one end of the rotary connecting rod rotatably connected to the first hinge base along a first rotation plane, and the other end of the rotary connecting rod rotatably connected to the second hinge base along the first rotation plane;
   wherein when the rotary connecting rod rotates to a folded state, the first substrate and the second substrate are parallel to and opposite each other; and when the rotary connecting rod rotates to a expanded state, the first substrate and the second substrate and are coplanar, and the first display area, the pliable display area and the second display area are coplanar; and
   a touch module disposed on the second substrate, and in the folded state, wherein the touch module contacts the pliable display area of the flexible display panel, the touch module controlling a display image on the first display area, and turning off the second display area and the pliable display area; in the expanded state, wherein the touch module separates from the pliable display area, the touch module controlling the images of the first display area, the pliable display area and the second display area.

2. The foldable display apparatus as claimed in claim 1, wherein the touch module includes a vertical plate disposed on the second substrate, a touch sensing unit and a display controlling unit disposed on a vertical plate, wherein the display controlling unit is electrically connected with the touch sensing unit, the first display area, the pliable display area, and the second display.

3. The foldable display apparatus as claimed in claim 1, further comprising a stopping mechanism disposed on the first substrate and the second substrate, the stopping mechanism limiting the first substrate and the second substrate to the expanded state or the folded state.

4. The foldable display apparatus as claimed in claim 3, wherein in the expanded state, a first end of the first substrate is close to and opposite a second end of the second substrate; the first hinge base is disposed near the first end, and the second hinge is disposed near the second end.

5. The foldable display apparatus as claimed in claim 4, wherein the stopping mechanism includes a first stopper disposed on the back of the first substrate and a second stopper disposed on the front of the second substrate, the first stopper is positioned on a side of the first hinge base away from the first end, the second stopper is positioned on a side of the second hinge base away from the second end, and in the folded state, the first stopper and the second stopper respectively abut the rotary connecting rod.

6. The foldable display apparatus as claimed in claim 5, wherein the first stopper and the second stopper each has a bevel cut, and bevels of the first stopper and the second stopper are used to abut the rotary connecting rod in the folded state.

7. The foldable display apparatus as claimed in claim 6, wherein the bevels of the first stopper and the second stopper each has an elastic layer.

8. The foldable display apparatus as claimed in claim 5, wherein the stopping mechanism further includes a first stopping slot disposed on the back of the first substrate and a second stopping slot disposed on the front of the second substrate, the first stopping slot is positioned on a side of the first hinge base near and through the first end, the second stopping slot is positioned on a side of the second hinge base near and through the second end, and in the expanded state, parts of the rotary connecting rod near the two ends respectively are received in the first stopping slot and the second stopping slot.

9. The foldable display apparatus as claimed in claim 1, wherein the first substrate and the second substrate each has a shape of a rectangular shape.

10. A foldable display apparatus, comprising:
    a first substrate;
    a second substrate;
    a flexible display panel having a first display area, a pliable display area and a second display area, which are sequentially connected, the first display area covering a front of the first substrate, the second display area covering a front of the second substrate;

a first hinge base disposed on a back of the first substrate;

a second hinge base disposed on the front of the second substrate;

a rotary connecting rod, one end of the rotary connecting rod rotatably connected to the first hinge base along a first rotation plane, and the other end of the rotary connecting rod rotatably connected to the second hinge base along the first rotation plane;

wherein when the rotary connecting rod rotates to a folded state, the first substrate and the second substrate are parallel to and opposite each other; and when the rotary connecting rod rotates to a expanded state, the first substrate and the second substrate are coplanar, and the first display area, the pliable display area and the second display area are coplanar, a touch module disposed on the second substrate, and in the folded state, wherein the touch module contacts the pliable display area of the flexible display panel, the touch module controlling a display image on the first display area, and turning off the second display area and the pliable display area; in the expanded state, wherein the touch module separates from the pliable display area, the touch module controlling the images of the first display area, the pliable display area and the second display area; and a stopping mechanism disposed on the first substrate and the second substrate, the stopping mechanism limiting the first substrate and the second substrate to the expanded state or the folded state.

* * * * *